(12) United States Patent
Hashidate et al.

(10) Patent No.: US 6,287,059 B1
(45) Date of Patent: Sep. 11, 2001

(54) MACHINE TOOL CLAMPING DEVICE (75) Inventors: Akitake Hashidate; Keita Misawa, both of Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 0 days.

(21) Appl. No.: 09/194,436
(22) PCT Filed: Mar. 4, 1998
(86) PCT No.: PCT/JP98/01568
   § 371 Date: Dec. 2, 1998
   § 102(e) Date: Dec. 2, 1998
(87) PCT Pub. No.: WO98/43767
   PCT Pub. Date: Oct. 8, 1998

(30) Foreign Application Priority Data
Apr. 3, 1997 (JP) .................................................... 9-100958

(51) Int. Cl.⁷ ............................. B23C 5/26; B23B 31/07; B23B 31/10
(52) U.S. Cl. ............................. 409/233; 279/900; 279/155
(58) Field of Search ............................. 409/233; 279/37, 279/900, 155; 483/31; 408/239 R (56) References Cited

U.S. PATENT DOCUMENTS

| | | | |
|---|---|---|---|
| 3,568,566 | * 3/1971 | Weidig | 409/233 |
| 3,762,271 | * 10/1973 | Poincenot | 409/233 |
| 4,075,927 | * 2/1978 | Frazier | 409/233 |
| 4,620,824 | * 11/1986 | Eckstein et al. | 409/233 |
| 4,628,586 | * 12/1986 | Yoshimi et al. | 409/233 |
| 4,997,325 | * 3/1991 | Heel et al. | 409/233 |

FOREIGN PATENT DOCUMENTS

| | | |
|---|---|---|
| 3-4323 | 1/1991 | (JP) . |
| 6-170623 | 6/1994 | (JP) . |
| 7-13923 | 4/1995 | (JP) . |
| 8-174315 | 7/1996 | (JP) . |

* cited by examiner

*Primary Examiner*—A. L. Wellington
*Assistant Examiner*—Erica E Cadugan
(74) *Attorney, Agent, or Firm*—McDermott, Will & Emery; Paul Devinsky (57) ABSTRACT

A machine tool tool changing device including a circular array of multiple collet fingers (5) housed in the shaft hole (12) of a spindle (1) capable of turning between a clamped position in which a tool holder (2) knob (22) is clamped and an unclamped position in which the knob is released, a collet sleeve (6) which surrounds the circular array of collet fingers and arrests the turning of same, an air cylinder which moves the collet sleeve axially relative to the collet fingers and releases the arresting of the collet fingers, a first plate spring (43) which exerts a strong force on the knob toward the spindle through the collet fingers, an air cylinder which removes the force exerted by the first plate spring, and a second plate spring (46) which exerts a force to maintain the collet fingers in the clamped position in opposition to the weight of the tool holder even if the collet fingers rotate and the force exerted by the first plate spring is removed.

5 Claims, 8 Drawing Sheets

MACHINE TOOL CLAMPING DEVICE

FIELD OF THE INVENTION

The present invention relates to a machine tool. More particularly, the invention relates to a clamping device for holding a tool holder such that the tool can be released to a hollow rotating spindle.

BACKGROUND TECHNOLOGY

In general, tapered shank tool holders having a knob on the tapered end are releasably held within a tapered socket on a complementary, hollow rotating spindle. The spindle has an axial hole which penetrates through the tapered socket, collet fingers which grip the tapered shank tool holder knob, and a draw bar connected to the collet fingers, housed so as to be able to slide in the shaft hole. The collet fingers are turnable in the space between the knob-gripping clamped position and the knob-releasing unclamped position. The draw bar is movable in the axial direction of the spindle between an operating position in which the tool holder is held in the spindle tapered socket and a non-operating position, in which the tool holder is released from the tapered socket.

In order to reliably hold the tool holder in the spindle tapered socket, a bias is normally applied on the draw bar toward the operating position by a strong spring force. At this point, the collet finger rotation is arrested, and the collet fingers are stopped in the clamped position. By this means, the knob held by the collet fingers is pulled toward the draw bar operating position, and the tapered shank is tightly fit into the tapered socket.

When machining by a given tool is completed, the machine tool controller generates a tool release signal, which releases the tool from the spindle. In response to this tool release signal, a tool changing device grips the tool holder which has been inserted in the spindle using an arm. When the controller receives a confirmation signal indicating that the tool changing arm has gripped the tool holder, it commands the draw bar to move against the spring force to the non-operating position using appropriate motion means, such as an air cylinder. By moving the draw bar to the non-operating position, tensile force from the spring is removed form the knob. The arresting of the rotation of the collet fingers ends with the movement of the draw bar. Nevertheless, the tool holder remains in the grip of the tool changing device arm, so that it will not fall down due to its weight.

However, a machine tool controller of this type cannot command the draw bar to move until a confirmation signal has been received. This is because when the draw bar moves to the non-operating position, i.e., until the tool changing device arm has gripped the tool holder, the weight of the tool holder causes the knob thereof to be released from the collet fingers, and a tapered shank may separate from the spindle tapered socket inside surface. Thus, in order to reliably prevent the tool holder from falling, the machine tool controller must wait for a confirmation signal. This wait time reduces tool changing operation efficiency.

SUMMARY OF THE INVENTION

An object of the present invention is to provide a clamping device which reliably holds a tool holder so that it can be released, without reducing the efficiency of the tool changing operation.

Other objects of the present invention are presented in the description which follows, or will be apparent to practitioners of the art by practice of the invention.

In order to achieve the above and other objects, of the invention a machine tool clamping device according to the present invention, which holds a tool holder having a knob onto a spindle having an axial a shaft hole in such a way that it can be released, comprises:

multiple collet fingers housed in the spindle axial hole so as to be turnable between a clamped position in which the tool holder is clamped and an unclamped position in which the knob is released;

a collet sleeve for arresting the turning of the collet fingers;

an air cylinder for moving the collet fingers and the collet sleeve relative to each other in the spindle axial direction to permit rotation of the collet fingers;

a first plate spring for applying a strong force to bias the knob against the spindle through the collet fingers;

an air cylinder for removing the biasing force of the first plate spring; and a second plate spring which maintains the collet fingers in a clamped position in opposition to the tool holder weight, even when the collet fingers rotate and the first plate spring is removed.

DESCRIPTION OF THE PRESENTLY PREFERRED EMBODIMENT OF THE INVENTION

A presently preferred embodiment of a clamping device according to the present invention will now be explained with reference to FIGS. 1, 2, 3A, 3B, 3C, 3D, 4A, 4B, 4C, and 4D.

Figure 1:
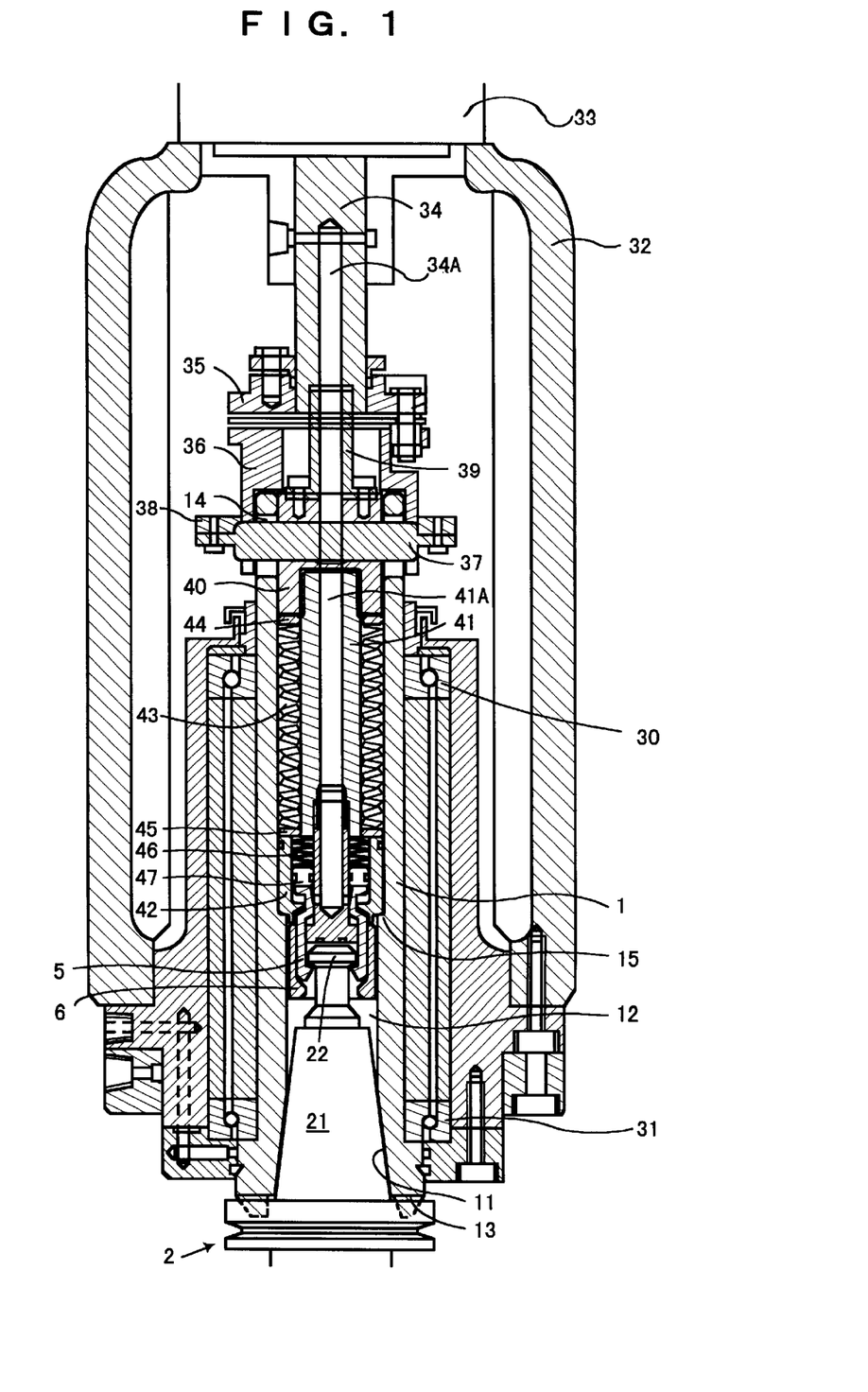
FIG. 1 is a vertical section illustrating a clamping device according to the present invention.

In the illustrated embodiment, a cylindrical spindle 1 having a tapered socket 11 which holds the tapered shank tool holder 2 formed on one end thereof, and has an axial hole 12 which connects to the tapered socket 11 is provided. The spindle 1 is supported for rotation by upper and lower angular bearings 30 and 31 having ceramic balls. The tapered shank tool holder 2 has a tapered shank 21 which is complementary to the tapered socket 11, and a knob 22 which protrudes from the tapered end thereof. Furthermore, the spindle 1 has two keys 13 which fit into a key channel on the tapered shank tool holder 2. The keys are formed on the perimeter edge of the opening in tapered socket 11. A group of long holes 14, formed on the other end of the spindle 1, are aligned with the axis thereof. The respective long holes 14 extend in the axial direction of the spindle 1. A pin or rod-shaped body can, by means of the pair of long holes 14, penetrate the spindle 1 and move in the axial direction of the spinale 1. A ring-shaped shoulder 15, having a variable diameter, is formed in the center portion of the spindle 1.

A motor 33 is connected to the top end of a cylindrical frame 32 such that its rotating shaft 34 is arrayed concentrically with respect to spindle 1. A hole 34A, which introduces pressurized air and coolant, is formed on the rotating shaft 34 of the motor 33. A coupling plate 35 is affixed to the rotating shaft 34. A cylindrical coupling 36 is joined at the top end to the coupling plate 35, and a cavity into which the top end of the spindle 1 fits is formed at the bottom edge thereof. Furthermore, long holes are formed at the bottom edge of the cylindrical coupling 36, corresponding to the long holes 14 in the spindle 1. A pin 37 penetrates the long holes 14 in the spindle 1, and fits into the long holes in the cylindrical coupling 36. The pin 37 is moveable relative to the spindle 1 and the cylindrical coupling 36 in the axial direction of the spindle 1. The ends of the pin 37 are affixed to a ring-shaped plate 38 provided at the perimeter of the cylindrical coupling 36. The ring-shaped plate 38 is slidable along the cylindrical coupling 36 by means of, for example, an air cylinder. In this manner, the rotational force of the motor 33 is transmitted to the tapered shank tool holder 2 through the rotating shaft 34, the coupling plate 35, the pin 37, the spindle 1, and the keys 13. One end of a connecting rod 39 fits into the rotating shaft 34 so as to be movable in the axial direction thereof, while its other end is affixed to a connecting piece 40. The connecting piece 40, which has a through hole into which the pin 37 fits, is screwed onto the top end of a draw bar 41. In this manner, the force driving the ring-shaped plate 38 which may comprise, for example, an air cylinder, is transmitted to the draw bar 41 through the pin 37 and the connecting piece 40. The draw bar 41 has a coolant supply hole 41A. The hole 41A is connected to the hole 34A in the rotating shaft 34 by means of the coolant supply holes formed respectively in the connecting rod 39, the connecting piece 40, and the pin 37. A sleeve 42 is affixed to the circumferential shoulder 15 on the spindle 1. A plate spring 43, which surrounds the draw bar 41, is housed between the sleeve 42 and the connecting piece 40 by means of ring-shaped collars 44, 45. Four collet fingers 5, which grip the knob 22 of tapered shank tool holder 2, are provided so as to be slidable on the inner surface of the sleeve 42.

Figure 2:
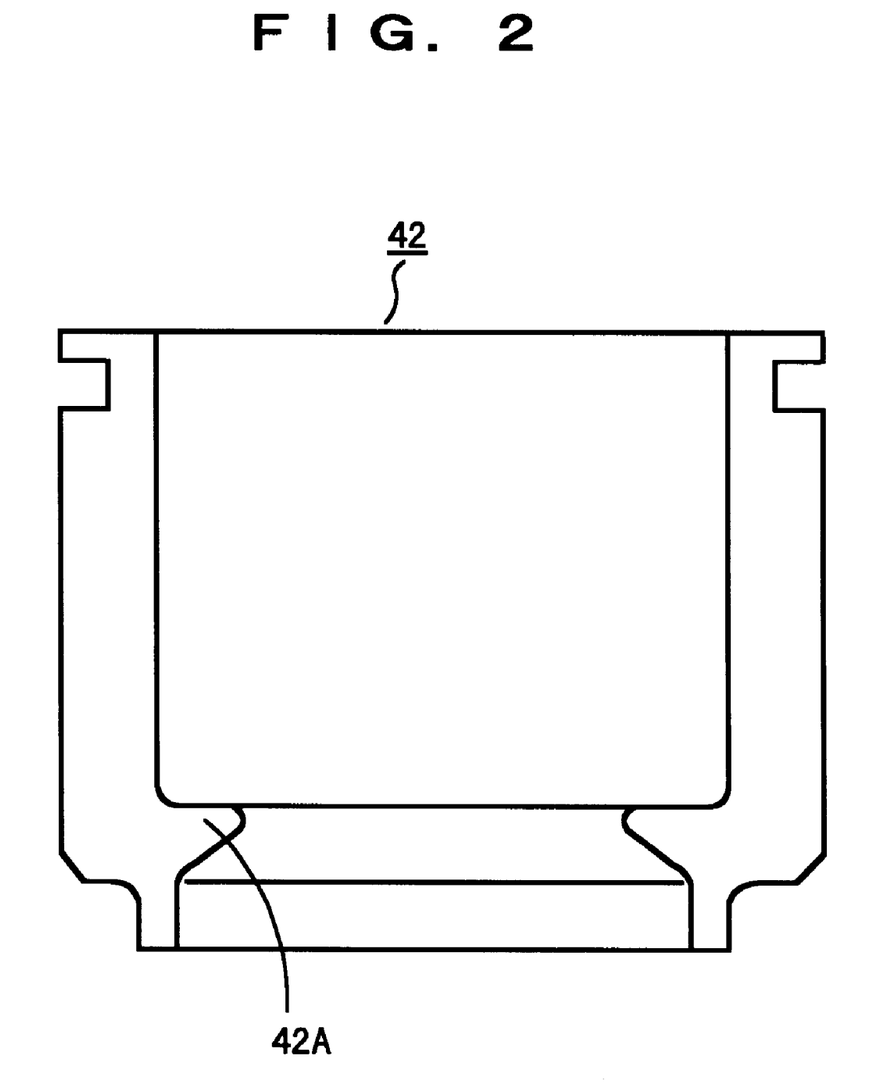
FIG. 2 is an expanded vertical section illustrating the sleeve of FIG. 1.
Figure 3A:
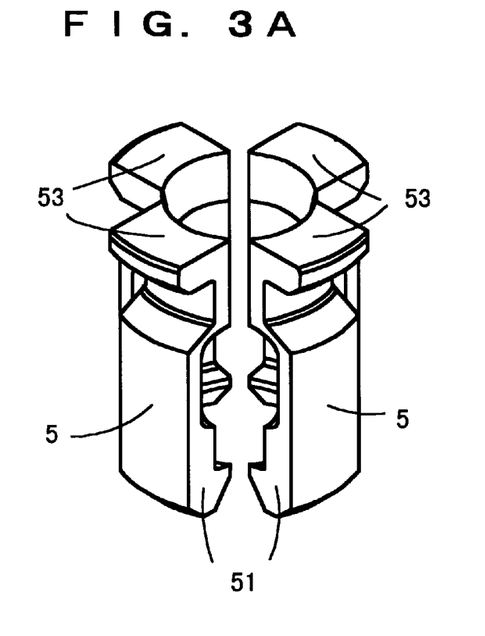
FIG. 3A is an expanded perspective view illustrating the circular arraying of the collet fingers of FIG. 1.
Figure 3B:
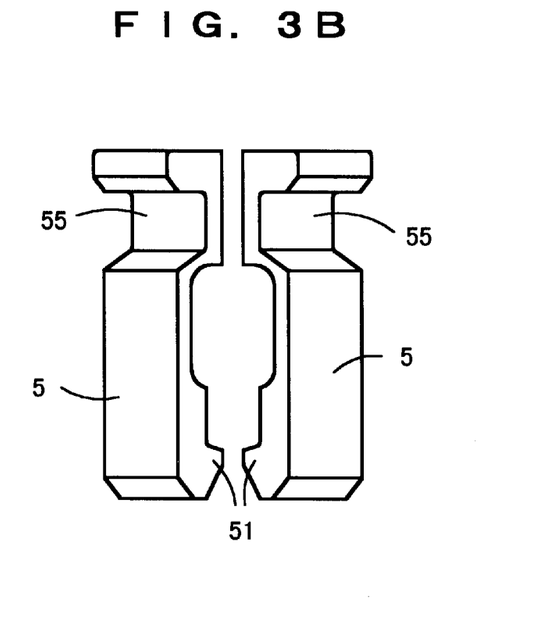
FIG. 3B is a front elevation illustrating the circular array of the collet fingers of FIG. 3A.
Figure 3C:
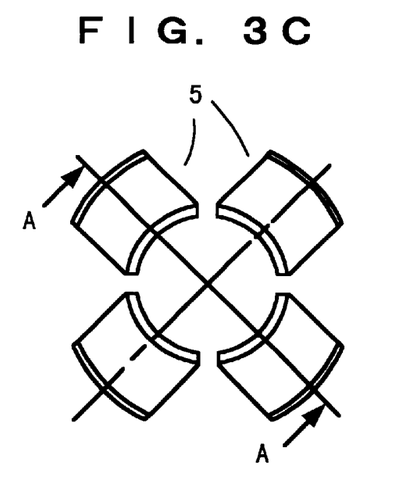
FIG. 3C is a bottom view illustrating the circular array of the collet fingers of FIG. 3A.
Figure 3D:
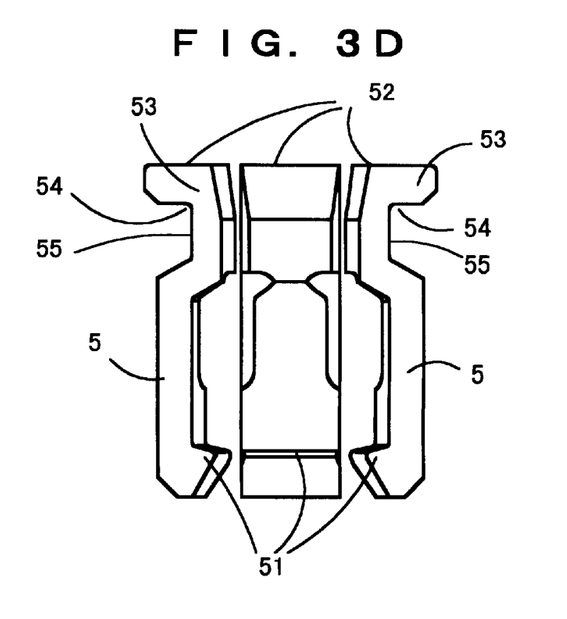
FIG. 3D is a vertical section viewed in the plane along the line A—A in FIG. 3C, illustrating the circular array of the collet fingers of FIG. 3A.

As illustrated in FIG. 2, a circumferential ridge 42A, extending radially inward, is formed on the sleeve 42. The four collet fingers 5 are arrayed in a circle around the spindle 1, and the circle array is surrounded over its entire perimeter by a collet sleeve 6. The collet sleeve 6 is linked by its shaft portion to the bottom end of the draw bar 41. In this way, the large holding force of the plate spring 43, which pulls the tool holder 2 upward in the axial direction, is transmitted to the collet fingers 5 through the connecting piece 40, the draw bar 41, and the collet sleeve 6. A plate spring 46, which surrounds the shaft portion of the collet sleeve 6, is provided between the circular array of collet fingers 5 and the draw bar 41. The circular array of the collet fingers receives the small spring force of the plate spring 46 through a piston 47.

As illustrated in FIGS. 3A, 3B, 3C, and 3D, the four collet fingers 5 are arrayed with equal spacing in a circle. A hook 51, which clamps the knob 22 on the tapered shank tool holder 2, and which extends radially inward, is formed at the bottom edge of the collet fingers 5. The collet fingers 5 can turn between the clamped position in which the knob 22 is clamped and the unclamped position in which the knob 22 clamp is released. In the FIG. 1 embodiment, the collet fingers 5 are held in the clamped position by receiving the spring force of the plate spring 46 on its top surface 52. A hook 53, which extends radially outward, is formed on the top edge of the collet fingers 5. The hook 53 is capable of meshing with the ridge 42A on the sleeve 42, thereby preventing the collet fingers 5 from falling. The collet fingers 5 are turnable about the inside shoulder 54 on the hook 53. The collet fingers 5 are moveable relative to the sleeve 42 by just the length of the linear outer surface 55 which connects with the inside shoulder 54.

Figure 4A:
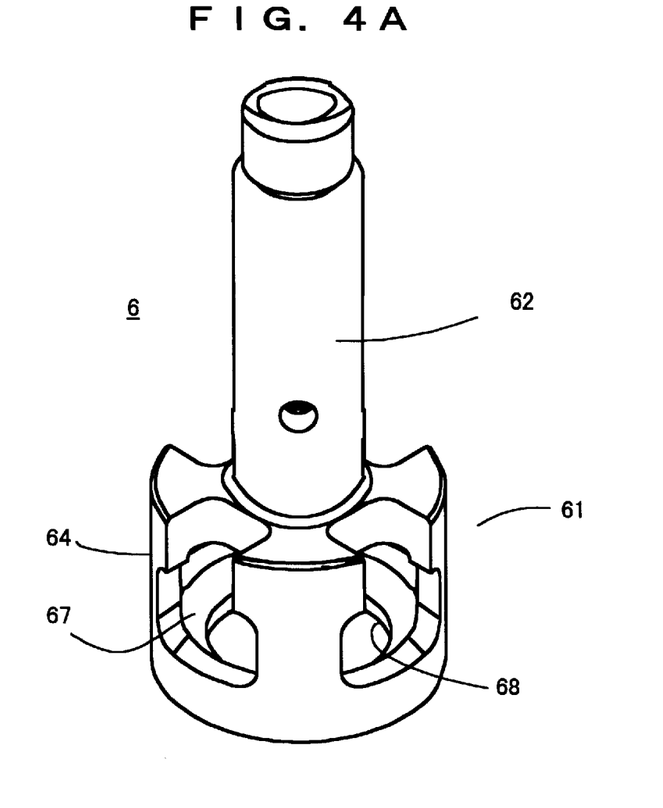
FIG. 4A is an expanded perspective view illustrating the collet spring of FIG. 1.
Figure 4B:
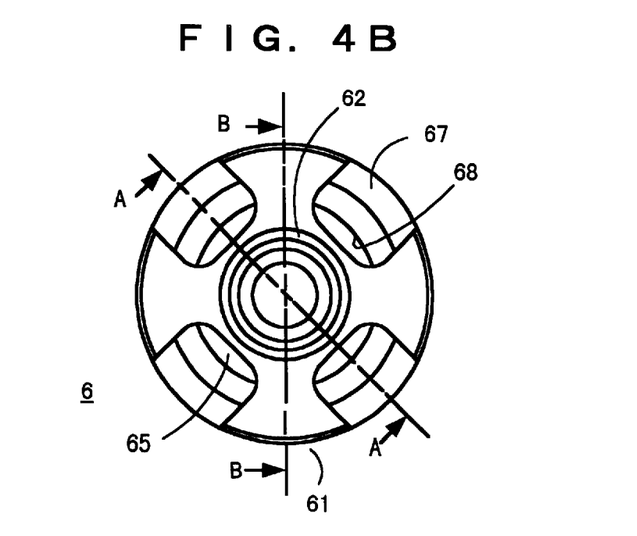
FIG. 4B is a top view illustrating the collet spring of FIG. 4A.
Figure 4C:
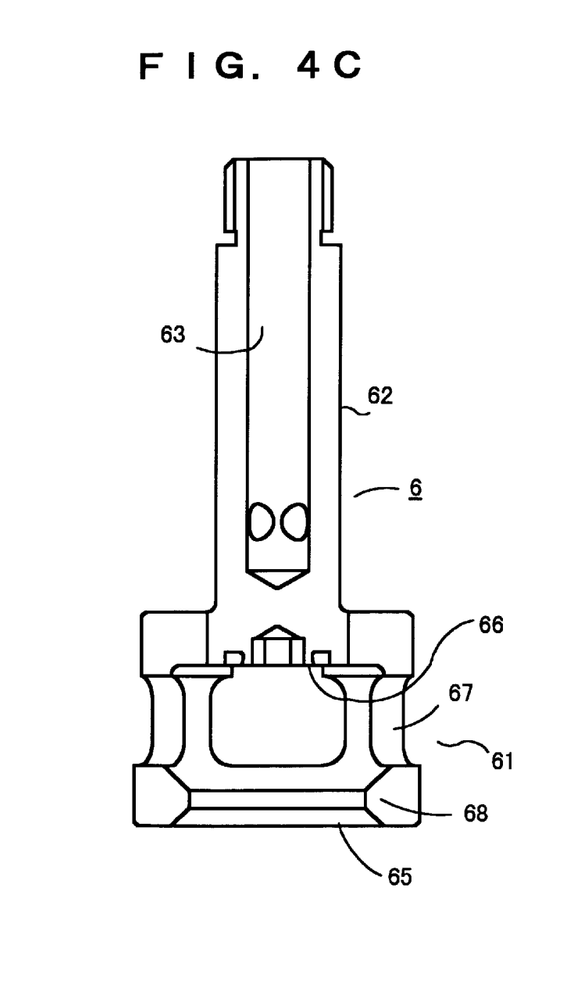
FIG. 4C is a vertical section viewed in the plane along the line A—A in FIG. 4B, illustrating the collet spring of FIG. 4A.
Figure 4D:
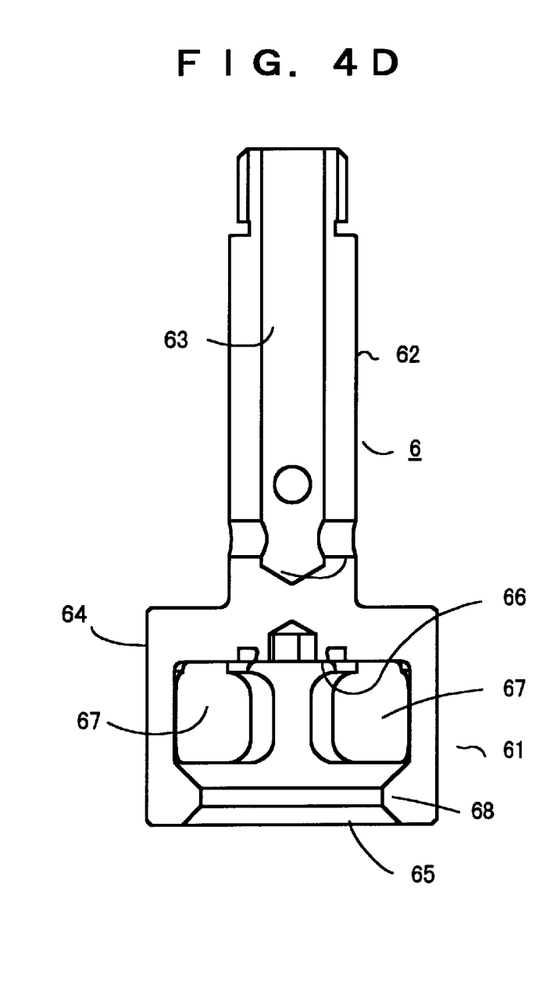
FIG. 4D is a vertical section viewed in the plane along the line B—B of FIG. 4B, illustrating the collet sleeve of FIG. 4A.

As illustrated in FIGS. 4A, 4B, 4C, and 4D, the collet sleeve 6 is formed from a sleeve body 61, which has a hole which houses the knob 22 of the tapered shank tool holder 2, and the shaft 62 which connects the sleeve body 61 to the draw bar 41. The shaft 62 has a coolant supply hole 63 which connects through to the draw bar 41 hole 41A. The outer surface 64 of the sleeve body 61 is slidable along the inner surface of the spindle 1. The sleeve body 61 has an opening 65 on its bottom portion. The knob 22 of the tapered shank tool holder 2 penetrates the opening 65 and faces the ejector surface 66, which is the ceiling of the sleeve body 61. Four windows 67 are formed on the sidewalls of the sleeve body 61. As best shown in FIG. 4A, the windows 67 extend to the upper surface of the sleeve body 61. The respective hooks 51 of the four collet fingers 5 are inserted from the windows 67 into the hole in the sleeve body 61. The circumferential ridge portion 68, which extends radially inward, is formed on the side wall of the sleeve body 61. The tapered walls of the ridge 68 conform to the tapered outer surface of the collet fingers 5 hook 51.

Referring to FIGS. 5A, 5B, 5C, 5D, 5E, 5F, and 5G, an explanation follows of the process whereby the tool holder 2 inserted in the spindle 1 is released.

Figure 5A:
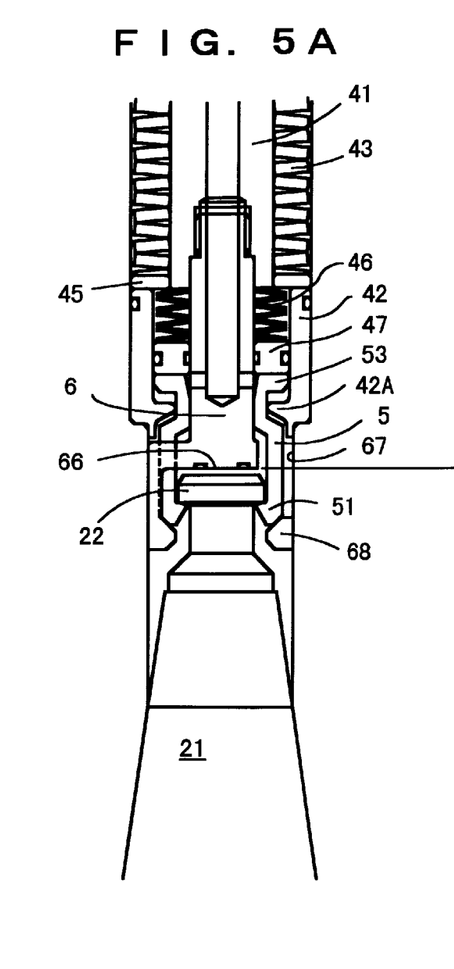
FIGS. 5A, 5B, 5C, 5D, 5E, 5F, and 5G illustrate the removal of the tool holder from the spindle to which it is attached.

FIG. 5A illustrates the state in which the component parts of the draw bar 41 and the collet sleeve 6 are raised to the farthest possible position by the spring force of the plate spring 43 which may, for example, be about 700 kgf. Restated, as depicted in FIG. 5A, the component parts of the draw bar 41 and the collet sleve 6 are in the operating position. The tapered shank 21 fits into the tapered socket 11 of the spindle 1, and the knob 22 is clamped by the collet fingers 5. The tapered inner surface of the ridge 68 of the collet sleeve 6 contacts the tapered outer surface of the hook 51 of the collet fingers 5, so that the pulling force of the plate spring 43 is applied to the knob 22 of the tapered shank tool holder 2.

Figure 5B:
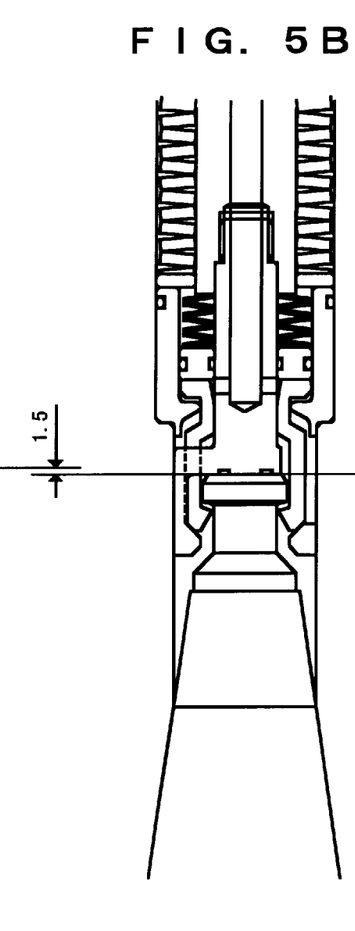

When the machine tool controller issues a tool release signal, the component parts of the draw bar 41 and the collet sleeve 6, as illustrated in FIG. 5B, are pushed down, for example, 1.5 mm, by an air cylinder (not shown) pushing in the axial direction in opposition to the tensile force of plate spring 43. Movement in the axial direction of the draw bar 41 is transmitted to the collet fingers 5 through the plate spring 46 and the piston 47. Because the collet fingers 5 move downward with the tapered shank 21 staying engaged in the tapered socket 11, the hook 51 of the collet fingers 5 moves 1.5 mm from the knob 22. In this way, the tensile force of the plate spring 46 is removed from the knob 22. The collet sleeve 6 ejector surface 66 then contacts the peak surface of the knob 22.

Figure 5C:
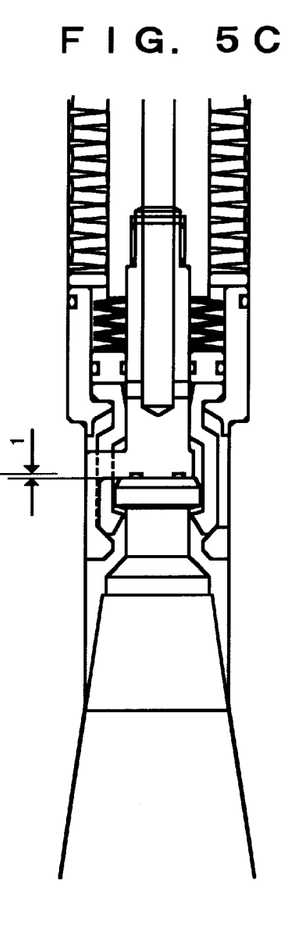

As illustrated in FIG. 5C, when the collet fingers 5 in contact with the knob 22 are pushed down a further 1 mm, the tapered shank 21 separates from the tapered socket 11. The hook 53 then meshes with the sleeve 42 ridge 42A, and the collet fingers 5 can no longer move downward.

Figure 5D:
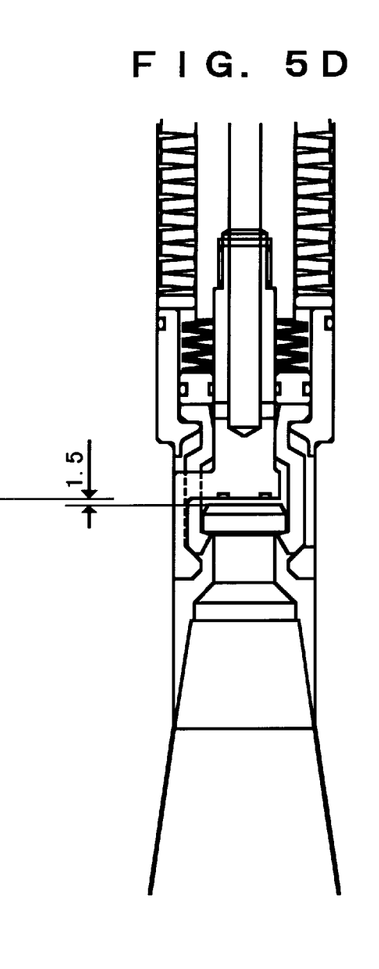

As illustrated in FIG. 5D, the tapered shank tool holder 2, separated from the tapered socket 11, falls 1.5 mm, and the collet fingers 5 again receive the weight of the tapered shank tool holder 2. At this point, contact between the collet sleeve 6 ridge 68 and the collet fingers 5 hook 51 is maintained, so the collet fingers 5 stay in the clamped position.

Figure 5E:
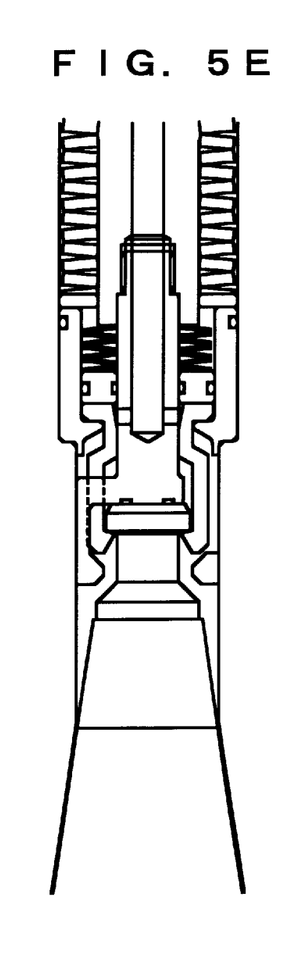

As illustrated in FIG. 5E, when the collet sleeve 6 ejector surface 66 is pushed down a further 1.5 mm, the ejector surface 66 again contacts the peak surface of the knob 22. By further downward movement of the collet sleeve 6, the collet sleeve 6 ridge 68 separates from the hook 51. As a result, the collet fingers 5 are able to turn to the unclamped position without being arrested by the collet sleeve 6. However, the spring force of the plate spring 46 keeps the collet fingers 5 in the clamped position in opposition to the weight of the tool holder, so that the tool holder does not fall down even if it is not gripped by the tool changing device arm.

Figure 5F:
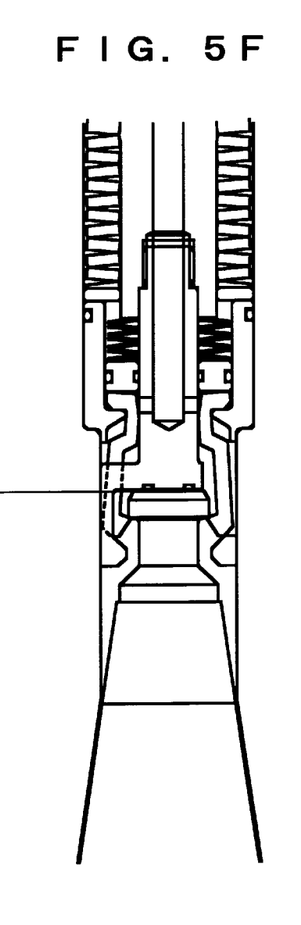
Figure 5G:
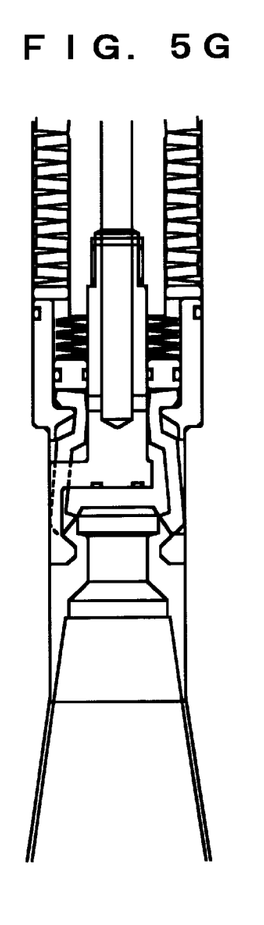

As soon as the tool changing device arm grips the tapered shank tool holder 2 in response to a tool release signal, the extraction of the tapered shank took holder 2 can commence. The tool changing device, as illustrated in FIG. 5F, pulls down the tapered shank took holder 2 by, for example, 0.5 mm in opposition to the spring force of the plate spring 46. As a result, the collet fingers 5 turn to the unclamped position, using the peak of the ridge 42A of the sleeve 42 as a support point. As illustrated in FIG. 5G, further pulling down of the tapered shank tool holder 2 by the tool changing device causes the collet fingers 5 to assume the unclamped position. As a result, the knob 22 of the tapered shank tool holder 2 is released by the collet fingers 5. When the knob 22 separates from the collet fingers 5, the collet fingers 5, as illustrated in FIG. 5E, are again returned to the clamped position.

It is not intended that the present invention be limited to the forms disclosed. It is clear than numerous improvements and variations are possible by reference to the above description. For example, in the embodiment, the ridge 42A which extents diametrically inward is formed on the sleeve 42, but a similar ridge could also be formed on the surface of the spindle 1 without providing a sleeve 42.

The illustrated embodiment was selected to explain the essence and practical application of the invention. The scope of the invention is defined in the attached claim.

What is claimed is:

1. A machine tool clamping device for releasably holding a tool holder having a tapered shank and a knob protruding from the tapered shank, the clamping device comprising:

a spindle, rotatable about an axis, and having a tapered socket at a lower end thereof, the tapered socket being complementary in shape to the shank of the tool holder, and an axial hole;

collet fingers positioned in the axial hole, the collet fingers being moveable between a clamped position in which the collet fingers clamp the tool holder knob, and an unclamped position in which the collet fingers release the tool holder knob;

a collet sleeve moveable in the axial hole, said collet sleeve having an ejector surface opposite the tool holder knob;

first biasing device tending to bias the collet sleeve toward an operating position wherein the collet sleeve locks the collet fingers in the clamping position while the ejector surface is separated from the tool holder knob;

means for moving the collet sleeve from the operating position to a non-operating position through an ejecting position in opposition to the first biasing device wherein when the collet sleeve is in the ejecting position, the collet sleeve locks the collet fingers in the clamping position while the ejector surface pushes the tool holder knob to thereby separate the tool holder from the spindle and wherein when the collet sleeve is in the non-operating position, the collet fingers are moveable to the unclamped position;

second biasing device to maintain the collet fingers in the clamping position even when the collet sleeve is in the non-operating position.

2. The machine tool clamping device according to claim 1, wherein the collet fingers are arranged in an essentially circular pattern about the spindle axis, each of the collet fingers having a lower end including a hook portion having a radially inwardly extending member for clamping the tool holder knob.

3. The machine tool clamping device according to claim 2, further comprising a sleeve affixed in the axial hole of the spindle, said sleeve having a circumferential ridge extending radially inward, wherein each of the collet fingers has an upper end extending radially outward for engagement with the circumferential ridge of the sleeve whereby the collet fingers may be hooked to the sleeve when the collet sleeve is moved from the ejecting position to the non-operating position.

4. The machine tool clamping device according to claim 2, wherein the first biasing device includes a draw bar, moveable between an operating position and a non-operating position, and biased by a bias force toward the operating position.

5. The machine tool clamping device according to claim 4, wherein the first biasing device further comprises a spring coaxially arranged about the draw bar.

* * * * *